June 24, 1930.  M. HARTER  1,767,977
FRUIT PICKER
Filed July 24, 1929
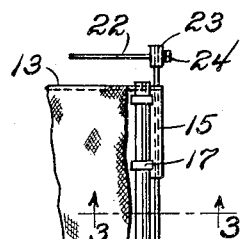
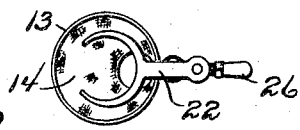
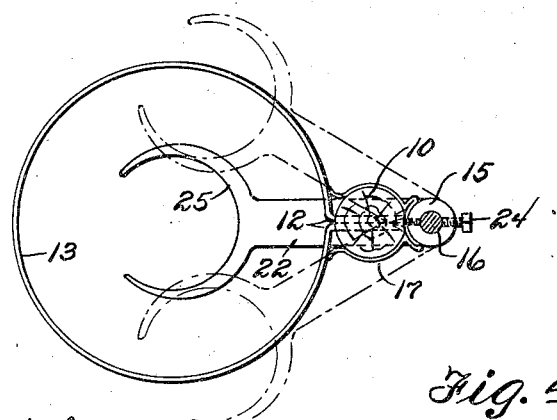
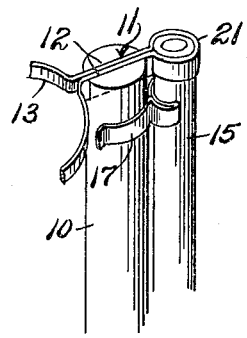
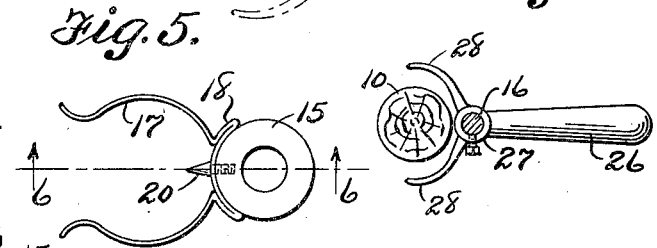
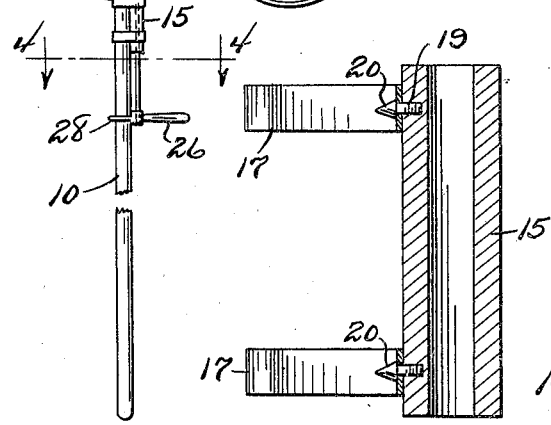
Mary Harter
INVENTOR
BY Victor J. Evans
ATTORNEY Patented June 24, 1930

1,767,977

UNITED STATES PATENT OFFICE

MARY HARTER, OF THURSTON, OHIO

FRUIT PICKER

Application filed July 24, 1929. Serial No. 380,602.

This invention relates to certain new and useful improvements in the harvesting art and especially to that subdivision of harvesters classified as fruit pickers.

An object of the invention comprehends the provision and arrangement of a picker of this type having a receptacle suspended from a support to be disposed adjacent the fruit.

Another object of the invention consists of a picking element operable to extend in different directions to pick and deposit fruit located at remote points from the receptacle.

An additional object of the invention embodies an operating means for the picking element.

More specifically stated the receptacle and operating means are provided with adequate means of support to prevent displacement of same while in use.

With the above and other objects in view, the invention further consists of the following novel features and details of construction, to be hereinafter more fully described, illustrated in the accompanying drawing and pointed out in the appended claim.

In the drawing:—

Figure 1 is an elevation of the picker.

Figure 2 is a top plan view thereof.

Figure 3 is a horizontal sectional view taken on line 3—3 of Figure 1.

Figure 4 is a view similar to Figure 3 taken on line 4—4 of Figure 1.

Figure 5 is a top plan view of a guide apparatus for the operating mechanism.

Figure 6 is a sectional view taken on line 6—6 of Figure 5 through the guide apparatus.

Figure 7 is a fragmentary perspective view of the means of support for the receptacle.

Referring to the drawing in detail wherein like characters of reference denote corresponding parts, the reference character 10 indicates generally a standard or support including a horizontally disposed slot 11 in the uppermost end thereof to accommodate the parallel arms 12 of a loop 13. A sack or receptacle 14, carried by and suspended from the loop 13, gradually tapers to provide a substantially reduced extremity adjacent its lowermost end whereby the fruit will pack therein but will be maintained against displacement therein incident to their own weight and can be only discharged or emptied therefrom when the sack or bag is disposed in an inverted position.

The guides, as mentioned in the foregoing, and as indicated at 15, are in the nature of sleeves to accommodate portions of an operating rod 16 within the respective bores thereof and to permit sliding action of the latter therethrough to extend and retract same with relation to the support or standard 10. Clamping members 17 having spring arms form saddle plates 18 of arcuate shape to conform with the adjacent surface portions of the sleeves or guides 15. Attaching elements 19 for the saddle plates 18 having connection with the sleeves or guides 15 terminate to provide pointed projections 20 extended between the arms of the clamping members 17 for biting engagement with the adjacent portions of the standard 10 whereby the guide sleeves will be maintained in position.

The parallel arms 12 of the loop 13 terminate to provide a clamping sleeve 21 arranged and oppositely disposed with relation to the loop and to accommodate the uppermost end of the adjacent guide sleeve 15 in the manner suggested in Figure 7 of the drawing whereby the receptacle or bag will be held against independent lateral movement upon the standard. The picker arm, mentioned in the foregoing, primarily resides in the provision of a plate 22 having a vertically disposed sleeve 23 upon one end including a set screw 24, for adjustable connection with the upper extended end of the operating rod 16. The remaining end of the plate 22 terminates to provide a tong like fruit engaging portion 25. The latter mentioned portion is so shaped to permit the insertion or passage of a stem or branch within the portion removed whereby the under side of the tong like extremity may be brought into direct engagement with the fruit to equalize the pressure thereagainst and to prevent bruising thereof.

A handle member 26 having adjustable connection through a sleeve 27 secured to the lowermost extremity of the operating rod 16 is in addition provided with stop arms 28 arranged upon the opposite sides of the standard 10 whereby lateral movement of the picker or fruit engaging arm in excess to that of the dotted line positions shown in Figure 3 of the drawing will be prevented. Such movement may be imparted to the picker arm upon lateral shifting movement exercised by the handle upon the operating rod 16. It may be desirous, during the harvesting or gathering of the fruit to pluck or otherwise disengage fruit located in otherwise inaccessible positions. The lateral shifting action of the picker arm will prove most effective for this purpose.

The invention is susceptible of various changes in its form, proportions and minor details of construction, and the right is herein reserved to make such changes as properly fall within the scope of the appended claim.

Having thus described the invention, what is claimed is:—

A fruit gatherer comprising a standard having a receptacle arranged adjacent its uppermost end and extended in parallelism therewith, guide sleeves having clamping arms frictionally engageable with said standard, fastening elements for the clamping arms upon the guide sleeves having pointed projections designed for biting engagement with the adjacent portions of the standard, an operating rod having sliding connection with said sleeves and extending for appreciable distances therebeyond, a picker arm carried upon the uppermost end of the operating rod and extended over the mouth of the receptacle, said arm having a tong like fruit engaging portion, and a handle carried upon the lowermost end of the operating rod operable to impart lateral and reciprocating actions to the picker arm beyond the mouth of the receptacle.

In testimony whereof I affix my signature.

MARY HARTER.